United States Patent [19]

Lenihan et al.

[11] Patent Number: 5,280,651
[45] Date of Patent: Jan. 18, 1994

[54] PORTABLE SOUND SYSTEM HAVING A DETACHABLE HEADSET FOR SELECTIVELY ENGAGING THE BODY TO FORM A CARRYING HANDLE

[75] Inventors: Gary G. Lenihan; Karl D. Lerch, both of East Aurora, N.Y.

[73] Assignee: Fisher-Price, Inc., East Aurora, N.Y.

[21] Appl. No.: 712,207

[22] Filed: Jun. 7, 1991

[51] Int. Cl.⁵ .................................................. H04B 1/08
[52] U.S. Cl. ...................................... 455/351; 455/89; 381/188
[58] Field of Search ................... 455/89, 90, 344, 348, 455/349, 350, 351; 379/58.61, 430; 381/87, 88, 183, 187, 188; D14/137, 138, 163, 165, 192, 196, 205, 223, 224

[56] References Cited

U.S. PATENT DOCUMENTS

| | | | |
|---|---|---|---|
| D. 266,417 | 10/1982 | Perez | D14/165 |
| D. 305,759 | 1/1990 | Balbuena | D14/223 |
| 2,397,306 | 3/1946 | Whipple . | |
| 2,502,832 | 4/1950 | Dockendorff . | |
| 2,678,999 | 5/1954 | Norris . | |
| 3,093,257 | 6/1963 | Miller . | |
| 4,691,383 | 9/1987 | DeMars . | |
| 4,930,148 | 5/1990 | Lee | 379/58 |
| 4,960,233 | 10/1990 | Morchower . | |
| 5,113,428 | 5/1992 | Fitzgerald | 379/61 |

FOREIGN PATENT DOCUMENTS 2407543 5/1979 France .

*Primary Examiner*—Reinhard J. Eisenzopf
*Assistant Examiner*—Chi H. Pham
*Attorney, Agent, or Firm*—Howrey & Simon

[57] ABSTRACT

A portable sound system including a body having an audio signal generator, such as a radio receiver or a tape cassette player, a headset and a communication line extending between the headset and the audio signal generator. The headset releasably engages the body such that a portion of the headset forms a load bearing handle for carrying the system. The headset engages the body to form a handle aperture therebetween for carrying the system. The headset includes a pair of opposing recesses in the headband, sized to engage tabs on a body to releasably engage the headset to the body such that a portion of the headset forms a load bearing handle.

11 Claims, 4 Drawing Sheets

PORTABLE SOUND SYSTEM HAVING A DETACHABLE HEADSET FOR SELECTIVELY ENGAGING THE BODY TO FORM A CARRYING HANDLE

The present invention relates to portable sound systems, more particularly, to a sound system having a detachable headset which releasably engages the body of the system to form a handle aperture therebetween for carrying the sound system.

BACKGROUND OF THE INVENTION

U.S. Pat. No. 2,397,306 discloses a portable radio receiver having a carrying handle extending from a casing. The carrying handle includes a gripping portion having a tuning scale for adjusting the receiver.

U.S. Pat. No. 4,691,383 discloses a compact radio wherein an earphone assembly is retained within a storage space in a disk-like body portion, such that the wire and earphone assembly cannot become entangled.

U.S. Pat. No. 2,678,999 discloses a portable radio comprising a headset sized to be received over the head to dispose a pair of earphones proximal to the ears.

SUMMARY OF THE INVENTION

A portable sound system having a body, a headset and attachment means for releasably engaging the headset such that a portion of the headset forms a load bearing handle for transportation of the system is disclosed.

The body of the present invention includes an audio signal generator, such as a tape player or AM-FM radio. Preferably, each end of the body includes a pair of projecting tabs separated by a predetermined distance.

The headset includes a headband having a pair of opposing recesses on the inner surface of the headband, wherein the recesses are separated by the predetermined distance. The recesses are sized to engage the tabs to releasably engage the headset to the body. Preferably, upon attachment of the headset and the body, a handle aperture is formed between the headband and the body. A portion of the headset thereby provides a load bearing handle for carrying the system.

DETAILED DESCRIPTION OF PREFERRED EMBODIMENTS

Figure 1:
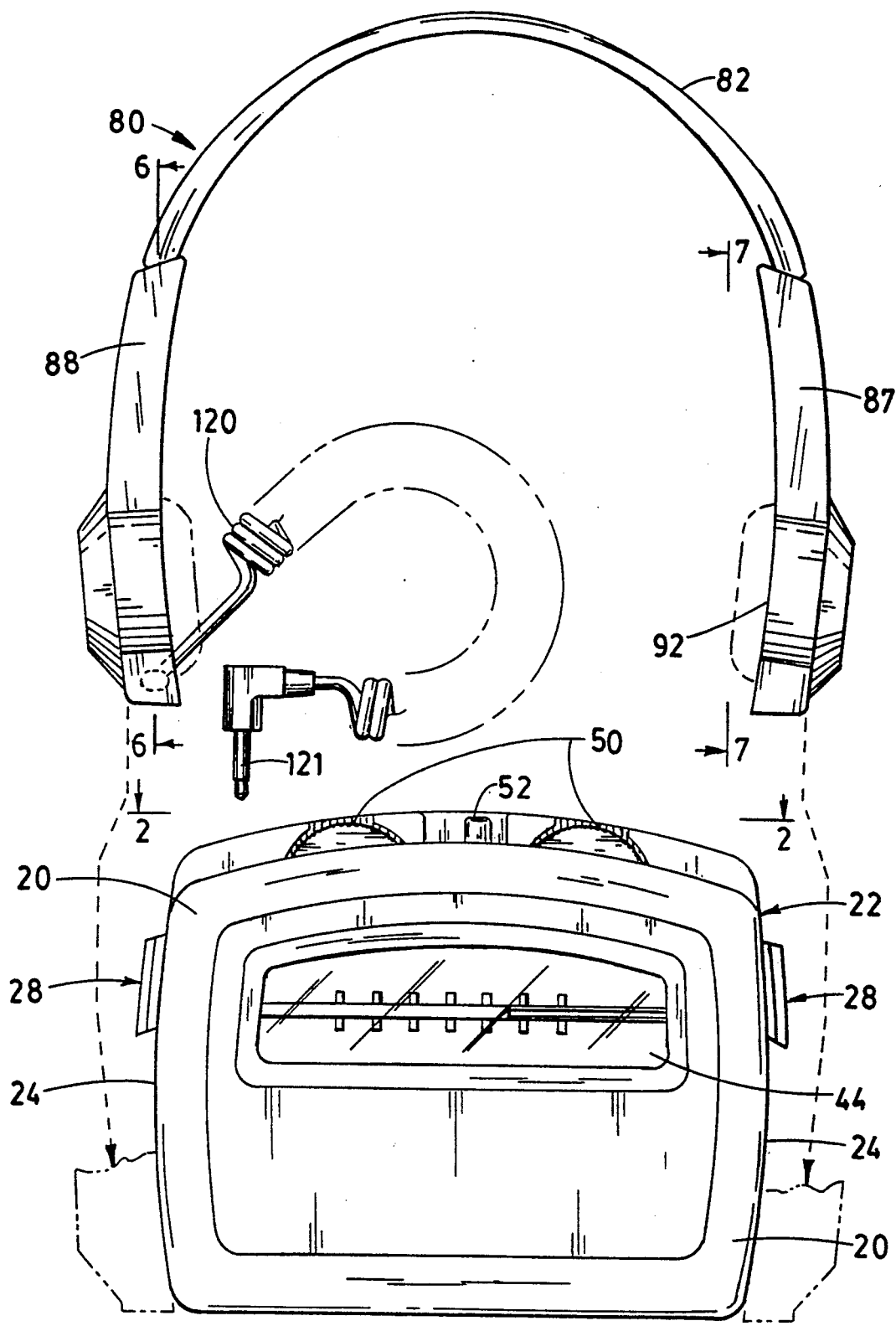
FIG. 1 is an exploded front elevational view of the present invention.

Referring to FIG. 1, the portable sound system 10 of the present invention includes a body 20, a headset 80, and a cord 120.

Figure 3:
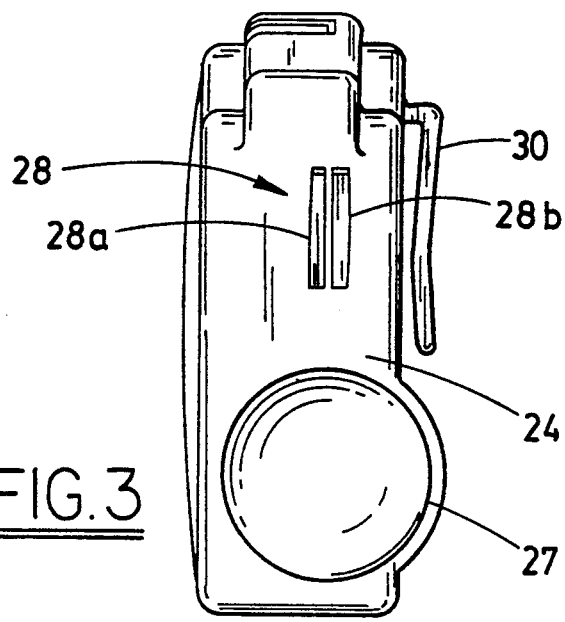
FIG. 3 is a side elevational view of the body of the present invention.
Figure 5:
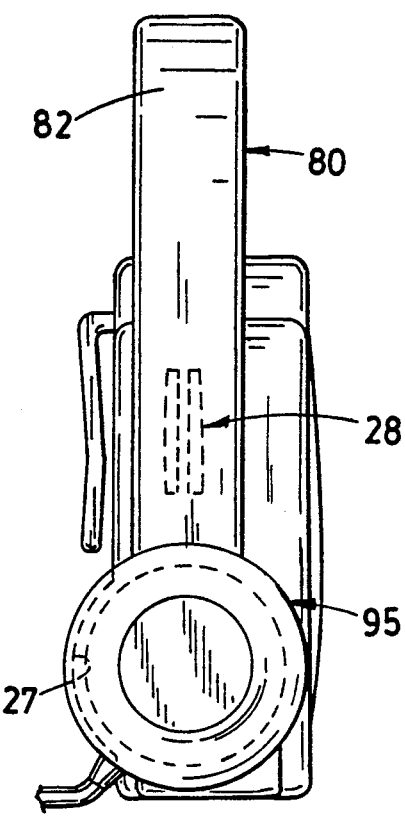
FIG. 5 is a partial side elevational view of the present invention.
Figure 8:
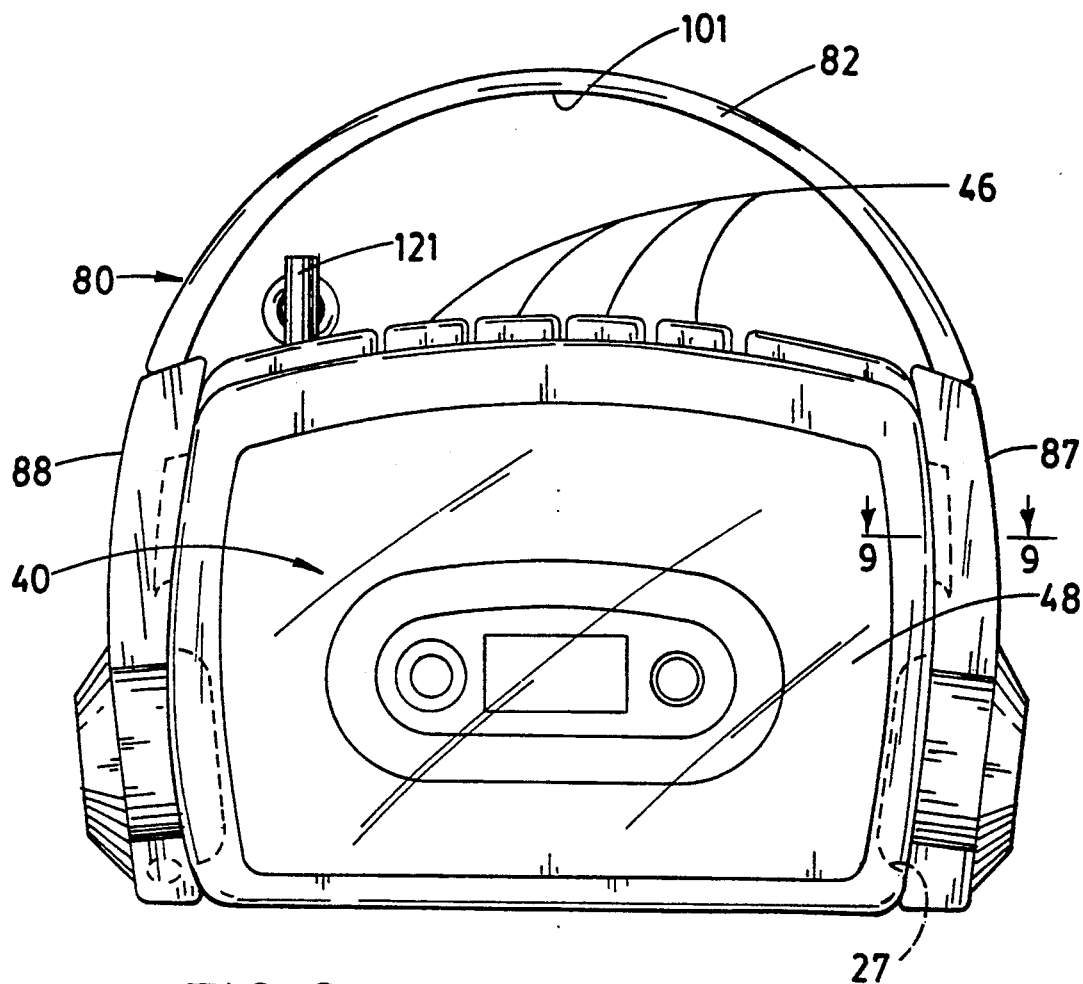
FIG. 8 is a front elevational view of the present invention showing the handle aperture.

The body 20 includes a housing 22 defining a generally rectangular volume. The housing 22 includes two end walls 24. Preferably, the end walls 24 are separated by a predetermined distance, substantially equal to the width of the average head. As shown in FIGS. 1 and 8, the end walls 24 are slightly convex. In a preferred embodiment, the predetermined distance between the end walls 24 is approximately 5.3125 inches. A pair of parallel tabs 28 extend from each end wall 24. Each pair of tabs 28 includes parallel, vertically extending members 28a and 28b separated by a gap 29. The lower ends of the members 28a and 28b define an acute angle between the end wall and the members. Preferably, the bottoms of the tab members 28a are inclined approximately 7° from a horizontal plane. Referring to FIG. 3, each end wall 24 includes a substantially circular pocket 27 beneath the tabs 28. The pocket 27 forms a circular recess in each end wall 24. As shown in FIGS. 3 and 5, the center of pocket 27 and longitudinal axis of the tabs 28 are colinear. The housing 22 includes a belt clip 30 as known in the art for releasably engaging a belt.

Figure 2:
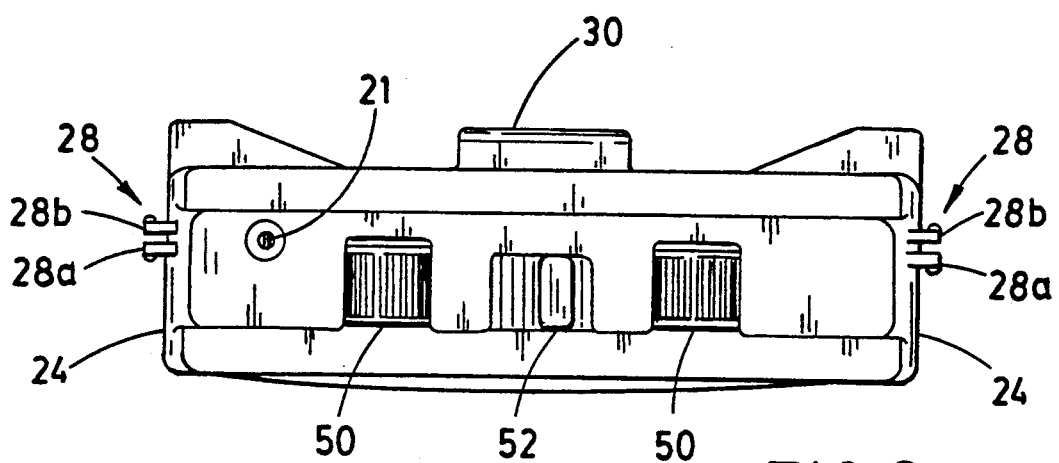
FIG. 2 is a sectional view taken along lines 2—2 of FIG. 1.
Figure 4:
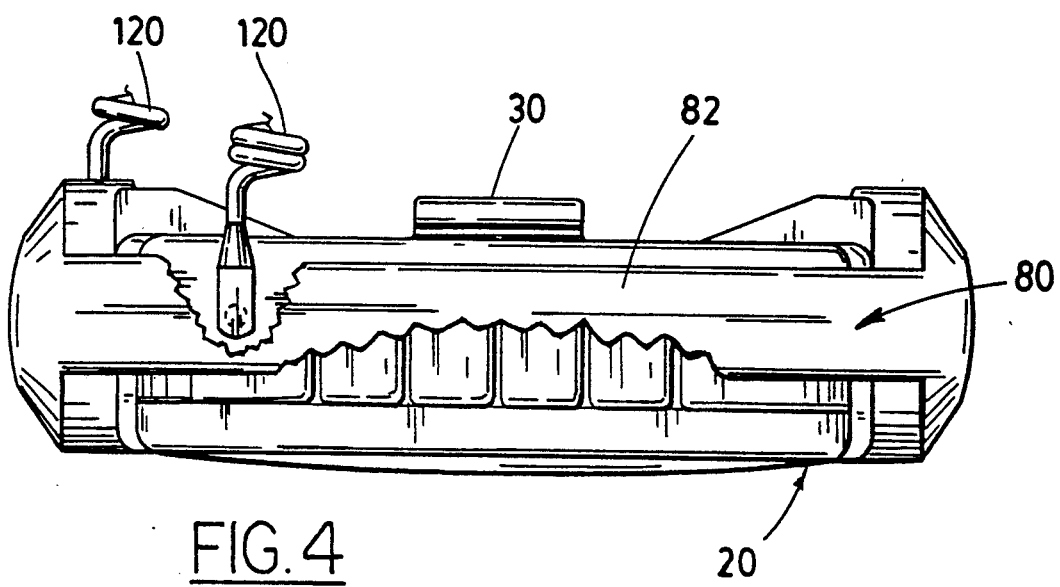
FIG. 4 is a partial top plane view of a second embodiment of the present invention.

Referring to FIGS. 1-4, an audio signal generator 40 is housed within the body 20. The audio signal generator 40 may be a cassette tape player 42 as shown in FIGS. 4 and 8, an AM-FM radio receiver 44 as shown in FIGS. 1-2, a compact disc player (not shown), or combination thereof, as is well known in the art. The body 20 includes a jack 21 in communication with the audio signal generator 40.

Referring to FIGS. 4 and 8, in an embodiment employing the cassette tape player 42, the body 20 includes function controls 46 such as play/fast forward/stop and eject buttons. Referring to FIG. 8, the housing 22 includes a cassette door 48 for introducing and removing a tape cassette (not shown) from the body 20. Similarly, if a compact disc player is employed, the standard control functions known in the art are included in the body 20.

Referring to FIGS. 1-2, in an embodiment employing a radio receiver 44, the body 20 includes tuning and volume controls 50, and AM/FM selection controls 52 as well known in the art. Preferably, the body includes a volume limiter (not shown) for setting the volume to a predetermined maximum level. The volume limiter may be located inside the body 20 to discourage unauthorized access by children.

Figure 6:
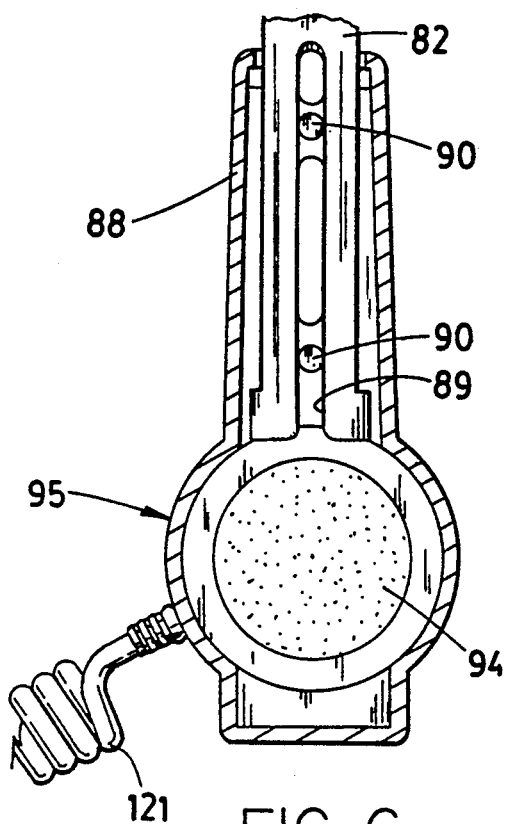
FIG. 6 is a cross-sectional view taken along lines 6—6 of FIG. 1.

Referring to FIGS. 1 and 6, the headset 80 includes an arcuate headband 82, a left housing 87 connected to one end of the headband, and a right housing connected to the other end of the headband, and earphones 92. The housings 87 and 88 are connected to the headband 82 to allow displacement of the housings 87, 88 relative to the headband. Each end of the headband 82 has a reduced width and includes an elongate slot 89. The left and right housings 87, 88 include a set of adjustment pins 90 sized to be received within the slots 89.

As shown in FIGS. 1, 3, 5 and 6, the earphones 92 are affixed proximal to the terminal ends of the headset 80. The earphones 92 are a transducer for converting an audio signal into acoustic energy such as sound waves. The headset 80 includes foam cushions 94 which extend over the earphones 92. . The cushions 94 provide an interface between the headset 80 and the user. As shown in FIGS. 5 and 6, the width of the headset 82 is less than the diameter of the earphones 92. The housings 87, 88 include a bulbous region 95. The bulbous region 95 partially encloses the earphones 92 to protect the earphone without unduly widening the width of the headband 82. The longitudinal axis of the headband 82 passes through the center of the earphone 92. Preferably, the diameter of the cushion 94 and earphone 92 is slightly less than the diameter of the bulbous region 95.

Figure 7:
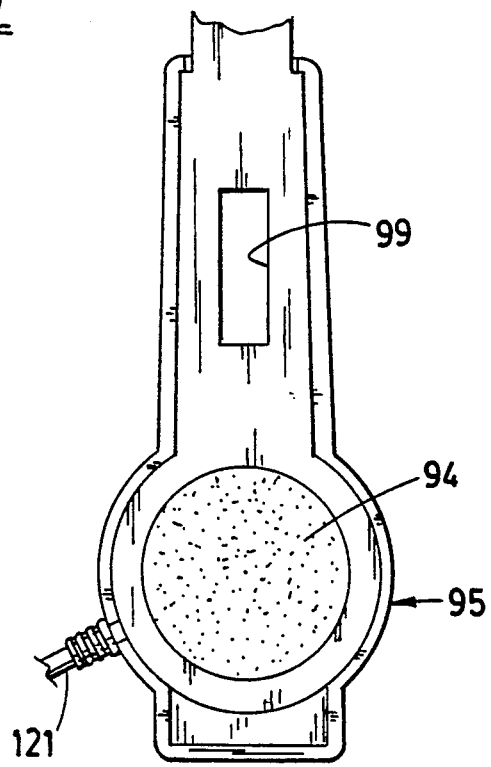
FIG. 7 is a sectional view taken along lines 7—7 of FIG. 1.
Figure 9:
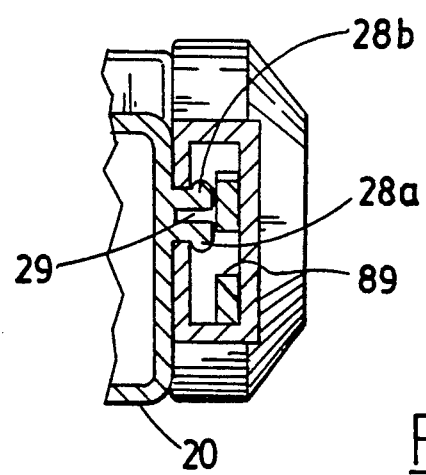
FIG. 9 is a cross-sectional view taken along lines 9—9 of FIG. 8.

Referring to FIGS. 7 and 9, the inner surface of the headset 80 includes opposing longitudinal apertures 99. Preferably, the longitudinal apertures 99 are separated by a distance substantially equal to the predetermined distance between the parallel tabs 28 on the end walls 24. Each aperture 99 is sized to releasably engage a set of tabs 28. Preferably, the longitudinal axis of each recess 99 is located along the longitudinal axis of the headset 82.

As shown in FIGS. 1, 4 and 5, a flexible cord 120 extends from the body 20 to the headset 80 for transmitting audio signals from the body to the headset. The cord 120 includes a plug 121 for operably connecting to the jack 21 as is well known in the art. The cord may extend directly to the earphones 92, or alternatively may plug into a compatible jack (not shown) in the headset 80. The cord 120 may be helical or straight, and includes a pathway for carrying an audio signal. The cord 120 conveys the audio signal between the body 20 and the headset 80 to provide a communication line therebetween.

OPERATION OF THE INVENTION

To listen to the audio signal generator 40, the the headset 80 is disposed about the head to orient an earphones 92 proximal to each ear. The relative position of the earphones 92 is adjusted by moving the pins 90 with the slot 89 to dispose the left and right housing 87, 88 relative to the headband 82. Preferably, the headset 80 is adjusted so that the foam cushion 94 contacts the ear.

The cord 120 has a sufficient length and resiliency to permit the body 20 to be carried in the hand, or connected to a belt (not shown) by the belt clip 30. The audio signal generator 40 is activated to produce an audio signal. The audio signal is travels through the cord 120 to the headset 80. The earphones 92 convert the audio signal into sound waves.

To transport the sound system, the headset 80 is removed from the user and disposed about the body 20, so that one set of parallel tabs 28 is received within each recess 99 in the headset 80. As the tabs 28 and pockets 27 are aligned, and the recesses 99 and the earphones 27 are aligned, either side of the headset 80 can cooperatively engage either end wall 24. Therefore, the attachment of the headset 80 and body 20 is left side/right side independent. Referring to FIG. 9, the parallel tabs 28a, 28b compress to pass through the aperture 99 and then relax to the unbiased state within the headset to retain the headset relative to the body. As the tabs 28 are received within the recesses 99, the earphones 92 and cushions 94 are received within the pockets 27. Therefore, as the headset 80 releasably engages the body 20, the inside of a portion of the headset is substantially coincident with the endwall 24, and the terminal end of the headset is coincident with the plane of the bottom of the body 20. The remaining length of the headset 80 extends from the body 20 to form a handle aperture 101. This extending length of the headset 80 provides a grasping portion for use as a load bearing handle for transportation of the system 10.

Preferably, upon engagement of the headset 80 and the body 20, an arcuate length of the headband 82 extends away from the body to form the handle aperture 101 between the body and the arcuate portion of the headset 80. The handle aperture 101 has a sufficient size to permit a portion of the hand (not shown) to pass between the headset 80 and the body 20. That is, distance along the headband between the recesses 99 is sufficiently large such that upon engagement of the tabs 28 and the recesses 99, a sufficient length of the headband is remote from the body to form the handle aperture 101 therebetween. The arcuate portion of the headset 80 thereby forms a load bearing handle for carrying the system 10.

Because the gap 29 and tab members 28a and 28b extend vertically, a longitudinal force along the length of the headset 80 will not draw the members 28a and 28b together to allow passage through the recess 99, and therefore will not separate the headset 80 from the body 20. In addition, the angle defined by the bottom of the tab members 28a, 28b provide a catch, or hook, to engage the periphery of the recess 99, thereby providing a load bearing contact between the headset 80 and the body 20. The sound system 10 may be carried by the arcuate portion of headset 80 forming the handle aperture 101 when the headset 80 engages the body 20 to form the handle aperture 101 therebetween. Preferably, the cord 120 is a resilient helix so that it assumes a contracted length when the headset engages the body.

To disengage the headset 80 from the body 20, a force on the headset directed perpendicularly away from the end wall 24 causes each pair of tab members 28a and 28b to decrease the gap between the tabs so that the tabs pass through the apertures 99. As the tabs 28 pass through the apertures 99 the headset 80 separates from the body 20.

Although the releasable attachment of the headset 80 to the body 20 is described in terms of cooperating tabs and recesses, snaps, slide fasteners, hook and loop fasteners, or other means known in the art may be used to engage the headset to the body such that a portion of the headset provides a load bearing handle.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:
1. A portable sound system, comprising:
(a) a body having an audio signal generator for producing an audio signal;
(b) a detachable headset having an earphone for converting the audio signal to sound waves the headset moveable between an attached position adjacent the body and a detached position remote from the body;
(c) communication means extending between the audio signal generator and the earphone for conducting the audio signal from the audio signal generator to the earphone in the detached and the attached positions of the headset; and
(d) attachment means for releasably securing the headset to the body in the attached position such that a portion of the headset forms handle means for bearing the weight of the body during transportation of the sound system.

2. The portable sound system of claim 1, wherein the handle means defines a handle aperture between the body and the headset such that a portion of the headset is grasped through the handle aperture.

3. The portable sound system of claim 1, wherein the attachment means comprises a set of tabs on one of the body and the headset and complementary recesses sized to releasably receive the tabs on the remaining one of the body and the headset.

4. The portable sound system of claim 1, wherein the audio signal generator comprises a magnetic tape player.

5. The portable sound system of claim 1, wherein the audio signal generator comprises a radio receiver.

6. The portable sound system of claim 1, wherin the audio signal generator comprises a compact disc player.

7. A protable sound system, comprising:
 (a) a body having audio signal generating means for generating an audio signal;
 (b) a detachable headset having earphone means for converting the audio signal into sound waves, the headset movable between an attached position adjacent the body and a detached position remote from the body;
 (c) communication means between the audio signal generating means and the earphone means for conducting the audio signal from the audio signal generating means to the earphone means in the attached and the detached position of the headset; and
 (d) attachment means for releasably engaging the headset to the body in the attached position such that a portion of the headset forms a load bearing handle for supporting the weight of the body.

8. The portable sound system of claim 7, wherein the load bearing handle comprises a portion of the headset.

9. A portable sound system comprising:
 (a) a body including a pair of tabs separated by a predetermined distance and an audio signal generator for producing an audio signal;
 (b) a headset having an earphone and a pair of spaced apart recesses sized to releasably engage the tabs to retain the headset relative to the body so as to form a handle aperture between the body and the headset; and
 (c) a communication line extending between the audio signal generator and the earphone for conducting the audio signal.

10. A portable sound system comprising:
 (a) a body including audio signal generating means;
 (b) headset means including a headband for supporting a sound reproducing transducer proximal to the ear of a user, the headband including a grippable portion for forming a transporting handle; and
 (c) attachment means on the body for releasably securing the headset means to the body with the grippable portion positioned relative to the body for allowing the body to be supported from the headset means and carried by the transporting handle.

11. The portable sound system of claim 10, further comprising communication means between the audio signal generator means and the headset means for carrying an audio signal to the headset means.

* * * * *